United States Patent [19]
Namba

[11] Patent Number: 5,427,225
[45] Date of Patent: Jun. 27, 1995

[54] SHEET-LIKE WORKPIECE DELIVERING APPARATUS

[75] Inventor: Susumu Namba, Kurashiki, Japan

[73] Assignee: Oimatsu Industries Company Limited, Okayama, Japan

[21] Appl. No.: 274,634

[22] Filed: Jul. 13, 1994

[30] Foreign Application Priority Data

Jul. 21, 1993 [JP] Japan .................. 5-180410

[51] Int. Cl.⁶ .............................................. B65G 47/22
[52] U.S. Cl. .................. 198/409; 198/346.2; 271/150
[58] Field of Search ............ 198/346.1, 346.2, 409, 198/468.6; 271/149, 150, 185, 225, 10

[56] References Cited

U.S. PATENT DOCUMENTS

| | | | |
|---|---|---|---|
| 4,178,122 | 12/1979 | Abrahamson | 198/409 X |
| 4,273,322 | 6/1981 | Ginther, Sr. et al. | 271/149 |
| 4,311,427 | 1/1982 | Coad et al. | 198/346.2 X |
| 4,537,208 | 8/1985 | Kuhl | 271/150 X |
| 4,903,818 | 2/1990 | Loehr et al. | 198/409 |
| 5,099,981 | 3/1992 | Guzzoni | 198/346.2 X |

FOREIGN PATENT DOCUMENTS

| | | | |
|---|---|---|---|
| 2536433 | 2/1977 | Germany | 198/346.1 |
| 0259741 | 11/1987 | Japan | 198/346.2 |

*Primary Examiner*—James R. Bidwell
*Attorney, Agent, or Firm*—Koda and Androlia

[57] ABSTRACT

A sheet-like workpiece delivering apparatus including a workpiece transfer device disposed in front of a work table of a machine tool and a workpiece storing device provided adjacent to and on the side of the workpiece transfer device. The workpiece storing device supports a sheet-like workpiece in a standing condition and supplies the workpiece to the workpiece transfer device or receives the workpiece for the workpiece transfer device. The workpiece transfer device further supports the sheet-like workpiece in a standing condition and receives the workpiece from the workpiece storing device or supplies the workpiece to the workpiece storing device and the workpiece in the workpiece transfer device is swingably moved from a standing condition to a horizontally extending condition or reversely about a longitudinal axis of the transfer device.

3 Claims, 7 Drawing Sheets

SHEET-LIKE WORKPIECE DELIVERING APPARATUS

BACKGROUND OF THE INVENTION

1. Industrial Field of the Invention

The preset invention relates to a sheet-like workpiece delivering apparatus which supplies a sheet-like workpiece to a machine tool such as a laser beam machine, for punching, drilling, notching, grinding and polishing or cutting of the workpiece, or which takes out the finished workpiece from the machine tool.

2. Description of the Prior Art

When a sheet-like workpiece (which will be hereinafter referred to as a workpiece) of an iron steel plate is, for example, cut with a laser beam machine, conventionally the iron steel plate is held by a lifting device, which includes suction disks or magnets, so as to be delivered to or taken out of a work table of the laser beam machine. The terms "delivered to or taken out of" may be replaced with "transferred to or from" in this specification. In the conventional art, when the workpiece cannot be hanged by the suction-disk lifting device because of the shape of the workpiece (holes or unevenness), or when the lifting device with magnets cannot be used because of the material of the workpiece (stainless steel, aluminum, plastics and so on), the workpiece must be transferred to or from the work table manually by a worker.

SUMMARY OF THE INVENTION

According to a conventional method or apparatus of transferring a workpiece, it is difficult to construct a manufacturing system having a transferring line which can deal with various workpieces each having different shape and material. That is to say, when transferring the workpiece to the work table and taking the workpiece out of the work table, it is often necessary to manually handle the workpiece other than utilizing the lifting device with the suction disks or magnets. Even if the complicated transferring line is developed, it is almost impossible to automatically control a number of transferring sequential operations. As a result, a substantial improvement with respect to a production efficiency cannot be obtained. Meanwhile, in a line for processing a large number of similar workpieces, a large space is required for storage of workpieces before and after machining. This is a problem to be solved by the invention. In deed, the space is usually restricted in the factory, so the number of stocking workpieces is sacrificed to save the occupation space of the storing container. The substantial impossibility of automatic control of the production line can be said to be a disadvantage due to the multikind and small-quantity production, and the restriction in number of the workpieces to be handled can be said to be a disadvantage due to the small-kind and mass production.

In order to solve the disadvantage of the multikind and small-quantity production, a workpiece has to be transferred without using the conventional lifting device with the suction disks or magnets or without relying on manual operation. That is to say, the workpiece is required to be transferred irrespective of the shape and material thereof. Further, in order to solve the disadvantage of the small-kind and mass production, it is necessary to reduce an occupation area of the installed apparatus as well as an area required for storing the workpieces, thereby effectively utilizing the yard within the factory. In view of the above, the inventors of the present invention have tried to investigate a novel and unique workpiece delivering apparatus.

As a result of the investigation, the inventors of this invention has developed a sheet-like workpiece delivering apparatus for a machine tool comprising workpiece transfer means disposed in front of a work table of the machine tool and workpiece storing means provided adjacently to and on the side of the workpiece transfer means, wherein the workpiece storing means can support a sheet-like workpiece in a standing condition, and supply the workpiece to the workpiece transfer means or receive the same from the workpiece transfer means, and the workpiece transfer means can support the sheet-like workpiece in the standing condition, and receive the workpiece from the workpiece storing means or supply the same to the workpiece storing means, the workpiece in the workpiece transfer means being moved from the standing condition to a horizontally-extending condition or reversely about a longitudinal axis of the transfer means ("the apparatus" which will appear in the specification implies "the sheet-like workpiece delivering apparatus"). It is preferable that the workpiece is supplied to or received from the workpiece storing means on the side of the workpiece transfer means. Additionally, "the standing condition" of the workpiece in the present invention implies not only that the workpiece stands substantially vertically, but also that it is slightly inclined so that it leans against a support framework of the storing means.

According to the apparatus, in the case where a manufacturing system having a transferring line in which workpieces having different shapes and made of different materials are handled, is constructed, the apparatus employs workpiece storing means, the workpiece storing means including a plurality of support frameworks having chain conveyers disposed along the lower edges of the frameworks. The chain conveyer are driven in synchronism with the workpiece transfer means. The support frameworks are spacedly arrayed and fixedly mounted on a base of the workpiece storing means in standing conditions. The base of the workpiece storing means can move with respect to a stationary basement in a direction of array of the support frameworks. Ball screw means is suitable as moving means for the base of the workpiece storing means. It is preferable to move the base of the storing means while detecting the position of the base by an encoder or the like.

According to the present invention, the workpiece transfer means preferably includes a workpiece holder having drive bars with rotatable feeder belts and receiving bars, which holder is attached to a movable base swingably movable between a standing condition and a horizontally-extending condition around a longitudinal axis thereof, and rollers to be synchronously driven which are attached to the movable base along the lower edge of the workpiece holder. The movable base can move with respect to a stationary basement parallel to a direction of transfer of the workpiece in the workpiece transfer means. As means for rotating the workpiece holder, a hydraulic cylinder or the like may be used.

According to the apparatus, in the case where a manufacturing system having a transferring line in which a large number of similar workpieces are handled, is constructed, the apparatus employs workpiece storing means wherein a rotary support framework includes a chain conveyer disposed along the lower edge of the framework, which chain conveyer is driven in synchronism with the workpiece transfer means. The rotary support framework is attached to the base of the storing means swingably movably between a standing condition to a horizontally-extending condition around a longitudinal axis thereof. The base of the workpiece storing means can move horizontally. In this case, the workpieces are housed in a generally-available storing container (for example, AMADA METREX K. K., model AMS951). The storing container includes a plurality of pallets spacedly stacked one above the other. Each of the pallets can be withdrawn out of the storing container and returned at the initial position in the storing container. A workpiece is taken out of the withdrawn pallet and transferred to the machine tool. As means for rotating the rotary support framework, there is a hydraulic cylinder. In order to move the base of the storing means, rails are extended on a stationary basement between a position corresponding to the workpiece transfer means to a position corresponding to the automatic storing housing. The base of the storing means runs on the rails by motor drive. The workpiece transfer means in this case may be similar to the above-described transfer means which is used in the multikind and small-quantity production.

According to the sheet-like workpiece delivering apparatus of the invention, the transferring of a workpiece between the work table of the machine tool and the storing means is automatically performed by the workpiece transfer means. The workpiece to be fed to the workpiece transfer means may be housed in the workpiece storing means or another storing container separately provided.

In the apparatus using the workpiece storing means having the plurality of support frameworks, the workpiece storing means serves as a storing container in which each support framework holds a workpiece. The support frameworks attached to the base of the storing means receive workpieces of different kinds or of the same kinds by the chain conveyers disposed along the lower edges of the support frameworks, and support the workpieces in the standing conditions. When the workpiece held by a certain support framework is supplied to the workpiece transfer means, the base of the storing means is moved on the stationary basement by means of the ball screw means or the like in order to change a relative position of the support framework with respect to the workpiece transfer means, so that an axis of the chain conveyer extended along the lower edge of the selected support framework is made coincident with a common axis of the rollers of the workpiece transfer means by precisely detecting the position of the support framework by the encoder. The workpiece is sent out of the support framework by driving the chain conveyer, and then, it rides on the rollers so as to be received by the workpiece holder because the rollers are driven in a direction of supply of the workpiece. The chain conveyer and the rollers are driven synchronously.

The workpiece holder of the workpiece transfer means receives the workpiece fed from the workpiece storing means, on the rollers disposed along the lower edge thereof. The workpiece holder supports the workpiece in the standing condition while it is slightly inclined with respect to the work table. Subsequently, the movable base is displaced toward the work table while maintaining the workpiece in the above-described condition. At a certain position adjacent to the work table, the workpiece holder is swingably rotated by means of a hydraulic cylinder or the like to extend horizontally, so as to mount the workpiece on the work table. In order to dispose the workpiece on the work table reliably, the workpiece holder needs to be somewhat lowered while being kept in the horizontally-extending condition so that the workpiece is directly disposed on the work table. After completion of the machining, the workpiece is returned to the workpiece storing means through a series of steps reverse to the above-described ones.

In case of using the workpiece storing means having the rotary support framework, at first, a workpiece is transported from the generally-available storing container to the workpiece storing means. Workpieces of the same kinds are piled up on each of the pallets spacedly stacked in the generally-available storing container. A selected pallet is taken out of the generally-available container by means of an elevator provided on the container. The workpieces piled up on the pallet are transported to the rotary support framework of the workpiece storing means successively from above. At this time, the rotary support framework is in a horizontally-extending condition and accordingly, the workpiece is also transported in a horizontally-extending condition. The conventional lifting device with handling attachments such as suction disks or magnets is used for the transportation of the workpiece.

In the workpiece storing means, after the workpiece is received by the rotary support framework, it is swingably rotated to bring the workpiece into a standing condition. Then, the workpiece storing means is moved to a position on the side of, that is, adjacent to the workpiece transfer means. The movement in that case is performed by driving the base of the storing means on rails laid on predetermined trucks by a motor. The workpiece storing means is stopped at a position where the axis of the chain conveyer along the lower edge of the rotary support framework coincides with the common axis of the rollers of the workpiece transfer means. The subsequent steps are similar to those in the already-described workpiece storing means having a plurality of support frameworks, and accordingly, a description thereof will be omitted. After completion of the machining, the finished workpiece is returned not to the generally-available storing container where it is initially stored, but to a finished workpiece storing container in steps reverse to the supplying steps. This is for the reasons that the remaining workpieces to be processed are piled up on the pallet of the generally-available storing container after the uppermost workpiece has been taken out. By thus using the generally-available storing container exclusively for the workpieces to be supplied and the finished workpiece storing container exclusively for the workpieces discharged from the work table of the machine tool, it is possible to efficiently process a large number of workpieces.

DETAILED DESCRIPTION OF THE INVENTION

A delivering apparatus for workpieces which are made of various kinds of materials and which have different shapes, includes a workpiece storing container 1 having a plurality of partitioning support frameworks 11. The workpieces are stocked in the workpiece storing container 1. This apparatus is used for delivering a workpiece 92 to a laser beam machine and returning the finished workpiece back to the workpiece storing container 1. The delivering apparatus comprises workpiece transfer means 2 disposed in front of the laser beam machine (in order to facilitate understanding of the drawings, only a work table 91 of the laser beam machine is illustrated, a main body of which is omitted from the drawings), and the workpiece storing container 1 disposed in adjacent to and on the right side of the workpiece transfer means 2, as viewed in FIG. 1. The workpiece storing container 1 in the delivering apparatus having such a structure as described above serves as a workpiece stock station.

Figure 1:
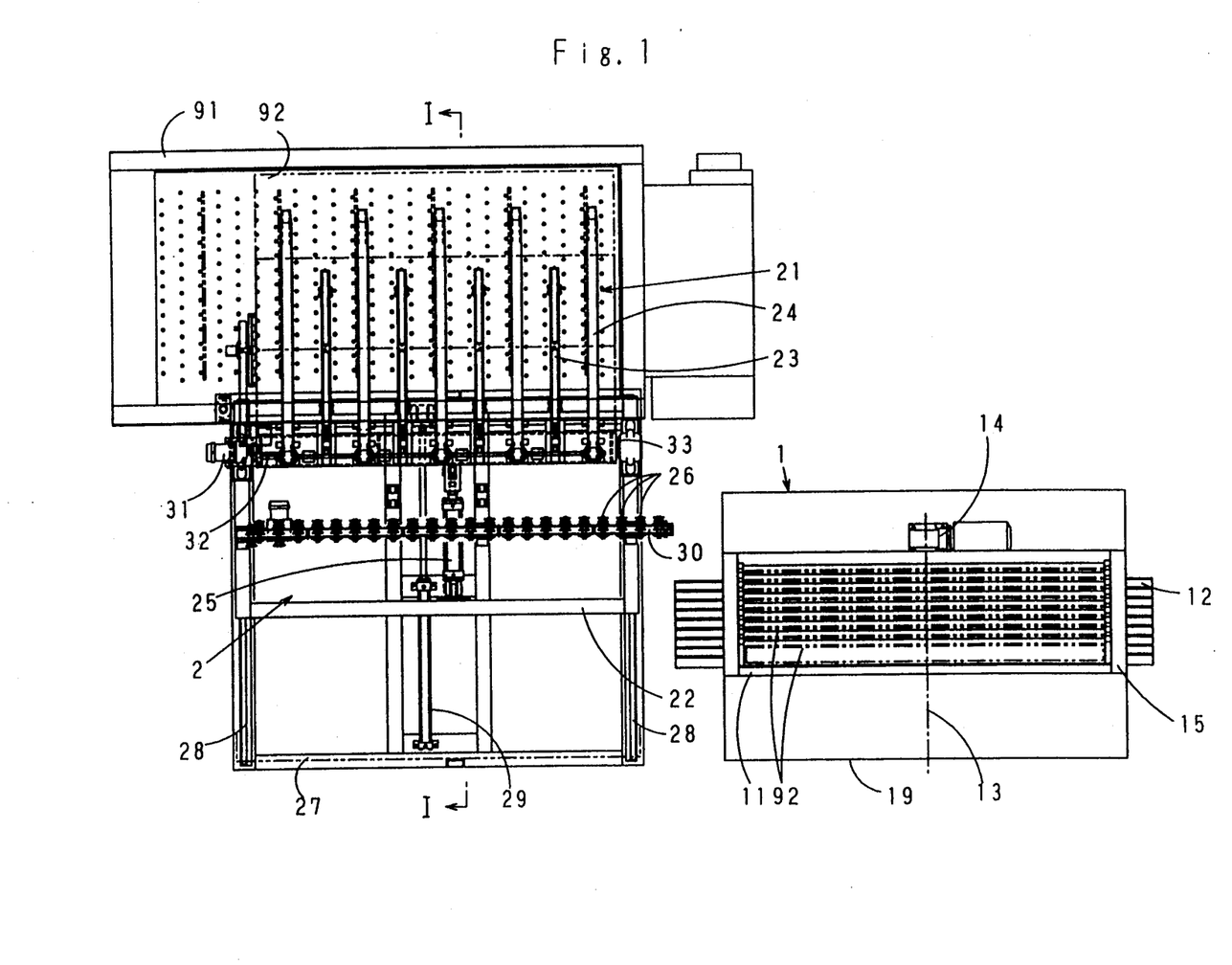
FIG. 1 is a plan view of a sheet-like workpiece delivering apparatus which is appropriate for multikind and small-quantity production.
Figure 2:
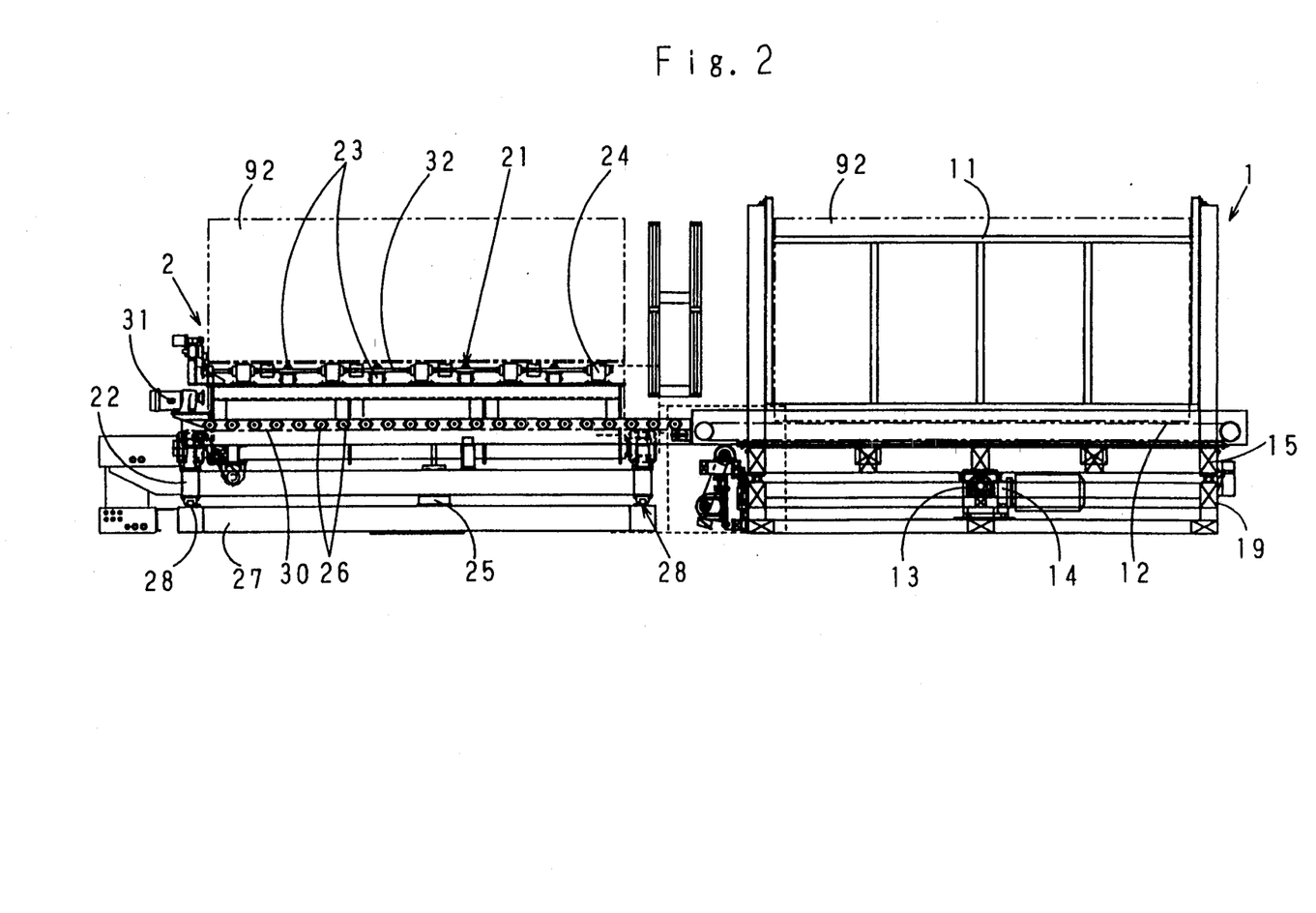
FIG. 2 is a front view of the apparatus shown in FIG. 1.
Figure 3:
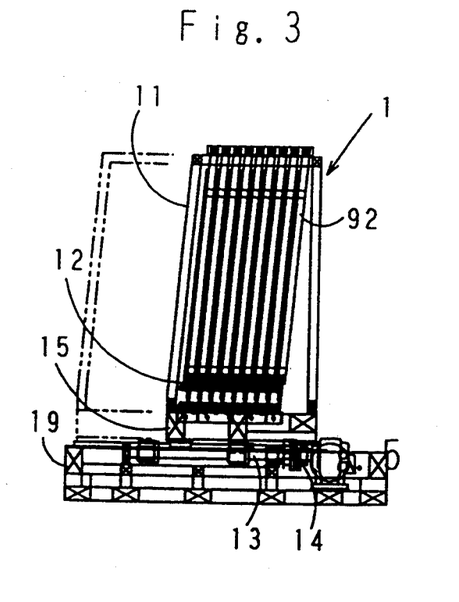
FIG. 3 is a side elevational view showing a workpiece storing container of the apparatus.

In the workpiece storing container 1 shown in FIGS. 1, 2 and 3, the partitioning support frameworks 11 having substantially rectangular shapes are fixedly mounted on a container base 15, each partitioning support framework standing upwardly and being spaced from the neighboring partitioning support frameworks. The interval between the neighboring support frameworks 11 may be predetermined at an extent so as to prevent interference between the workpieces 92. A chain conveyer 12 is extended along the lower edge of each support framework 11, which chain conveyer 12 receives the workpiece 92. The workpiece which rides on the chain conveyer can be moved in a direction parallel to the support framework 11. The workpiece 92 is taken in and out of the workpiece storing container 1 by means of the chain conveyer 12.

The whole of the support frameworks 11 moves in a direction perpendicular to the transportation of the workpiece between the support frameworks, together with the container base 15. Ball screw means 13 as means for moving the support frameworks 11 realizes highly efficient and accurate movement of them. An encoder 14 for detecting the position of the support frameworks or the base is incorporated in the ball screw means 13, and these ball screw means and encoder are mounted on a lower face of the container base 15 so that the support frameworks 11 and the container base 15 can displace with respect to a stationary basement 19. Thus, the workpiece storing container 1 changes its relative position with respect to the workpiece transfer means 2. As a result, a workpiece 92 can be withdrawn out of a selected one of spaces between the support frameworks 11 to a workpiece holder 21 of the workpiece transfer means 2 and returned back to the space.

Figure 4:
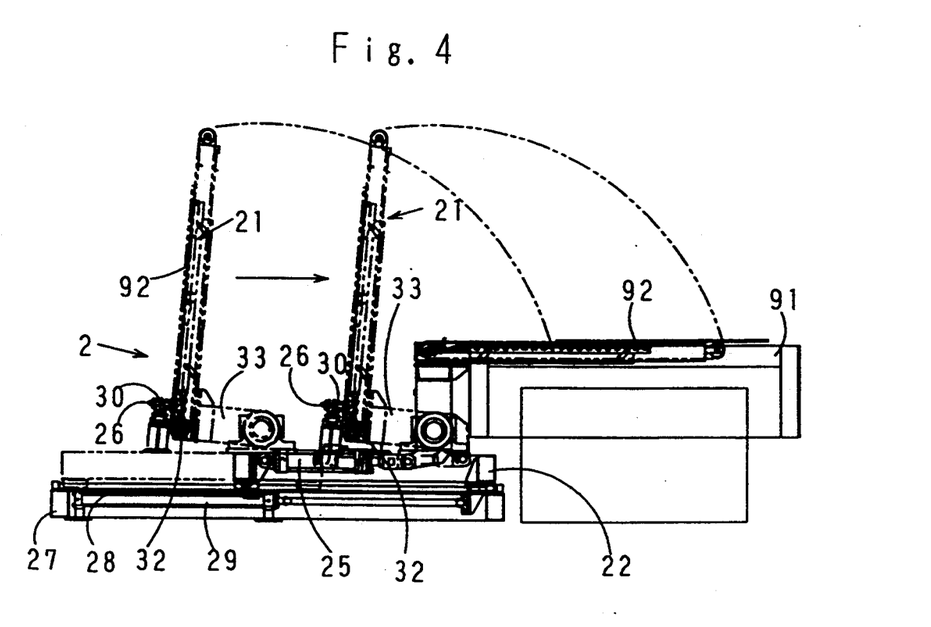
FIG. 4 is a cross-sectional view taken along line I—I of FIG. 1.

As shown in FIGS. 1, 2 and 4, in the workpiece transfer means 2, a movable rectangular frame base 22 is mounted on a stationary basement 27, the base 22 being capable of reciprocally moving between the work table and the initial position. The workpiece holder 21 is pivotally attached to the movable frame base 22 to swing about a longitudinal axis of the holder 21. Rails 28, 28 are provided on the stationary basement 27 in the lateral direction or a direction parallel to the movement of the workpiece holder (in a direction toward the front face of the laser beam machine in this embodiment). The stationary basement 27 and the movable frame base 22 are connected to each other through an actuator cylinder 29. By the operation of the actuator cylinder 29, the movable frame base 22 can be reciprocally moved close to or apart from the laser beam machine work table. In order to carry out speedy and reliable transferring of the workpiece 92 between the base 22 and the container 1, the movable frame base 22 includes a drive chain conveyer 30 extending along the lower portion of the workpiece holder 21 so that a chain belt of the drive chain conveyer runs along a receiving plane of the workpiece holder (in a direction parallel to the retaining plane of the support framework of the workpiece storing container in the illustrated embodiment). The movable base 22 also includes rollers 26 spacedly arranged in series in a longitudinal direction of the drive chain conveyer 30. All of the rollers 26 can be operated by a common drive source and synchronously driven in normal and reverse directions.

Figure 5:
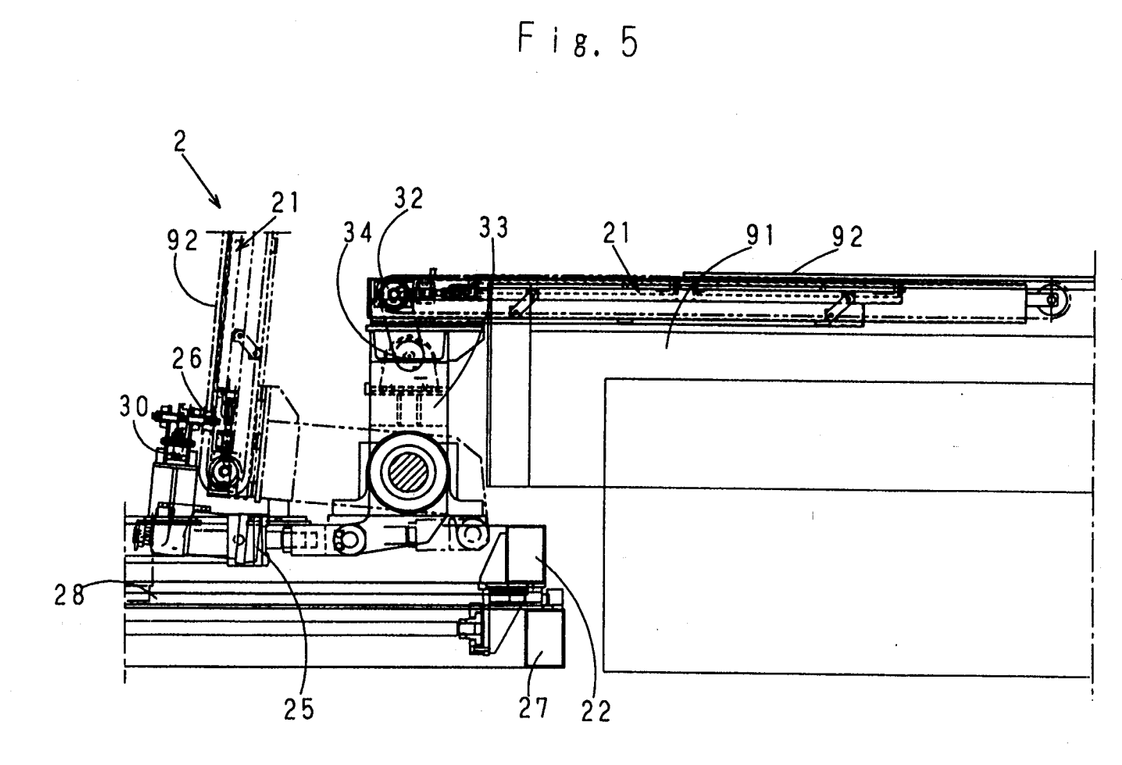
FIG. 5 is an enlarged view showing a rotating portion in FIG. 4.

According to the relation between the workpiece transfer means 2 and the workpiece storing container 1, the chain conveyer 12 sends the workpiece 92 from the workpiece storing container 1 to the drive chain conveyer 30, and when the workpiece is received by the chain belt of the chain conveyer 30, the rollers 26 are simultaneously driven to move the chain belt for pulling the workpiece 92 from the chain conveyer 12. At this time, the workpiece 92 is fed in such a condition that it stands while it is slightly inclined toward the work table 91. The workpiece holder 21 comprises four receiving bars 23 for merely supporting the workpiece 92 and five drive bars 24 having feeder belts, each feeder belt being driven in a direction parallel to the drive bar 24 by a motor 31. As seen in FIG. 5, lower ends of the respective bars 23, 24 are fixedly attached to a common driving shaft 32, which shaft is connected to a rotary arm 33. The rotary arm 33 is in turn coupled to a fall-down cylinder 25 pivotally attached to the movable frame base 22 at a position remote from the shaft 32. When the fall-down cylinder 25 is extended, the workpiece holder 21 is in a standing position (the rotary arm 33 being in a horizontally-extending condition). Meanwhile, when the cylinder 25 is contracted, the workpiece holder 21 is in a horizontally-extending position (the rotary arm 33 being in a standing condition).

Now, steps of supplying a workpiece from the workpiece storing container to the laser beam machine will be explained with reference to FIG. 1.

The workpiece 92 transferred to the workpiece transfer means 2 comes close to the work table 91 of the laser beam machine by contracting the sliding cylinder 29, while the workpiece 92 is maintained in a standing condition. When reaching at a predetermined location in front of the work table 91, the fall-down cylinder 25 is contracted to swing up the rotary arm 33, so that the workpiece holder 21 extends horizontally so as to supply the workpiece 92 onto the work table 91. Further, the drive bars 24 push the workpiece 92 in order to advance it at a position appropriate for machining. When the workpiece 92 is desirably horizontally positioned, the receiving bars 23 and the drive bars 24 of the workpiece holder 21 are slightly lowered so that the workpiece 92 is directly supported by the work table 91, whereby the workpiece 92 becomes stable. This is achieved by a mechanism in which the shaft 32 and the rotary arm 33 are connected with each other via a rotary cylinder 34 through a crank chain. After completing the machining, the workpiece 92 is taken out by plural steps reverse to the above ones, so as to be returned to the support framework 11 of the workpiece storing container 1 where it is initially stocked.

The above-described apparatus can deal with the workpiece 92 irrespective of the shape and material thereof because it doesn't necessitate any conventional lifting device having handling attachments such as suction disks or magnets which enables transferring of the workpiece 92 between the workpiece storing container 1 and the work table 91. Therefore, the apparatus according to the present invention can be used in various applications. Further, the workpieces 92 which are to be supplied and which have been finished, can be stored in the same workpiece storing container 1 in the standing conditions. Accordingly, an occupation space required for the apparatus can be advantageously minimized. A series of steps can reliably be performed by the mechanical driving system and the precise positioning of the workpiece storing container 1 can be established, so that the operations of the apparatus are automatically controlled by a minimum number of workers. The apparatus having those unique advantages may be comprehended as an apparatus appropriate for multikind and small-quantity production.

Figure 6:
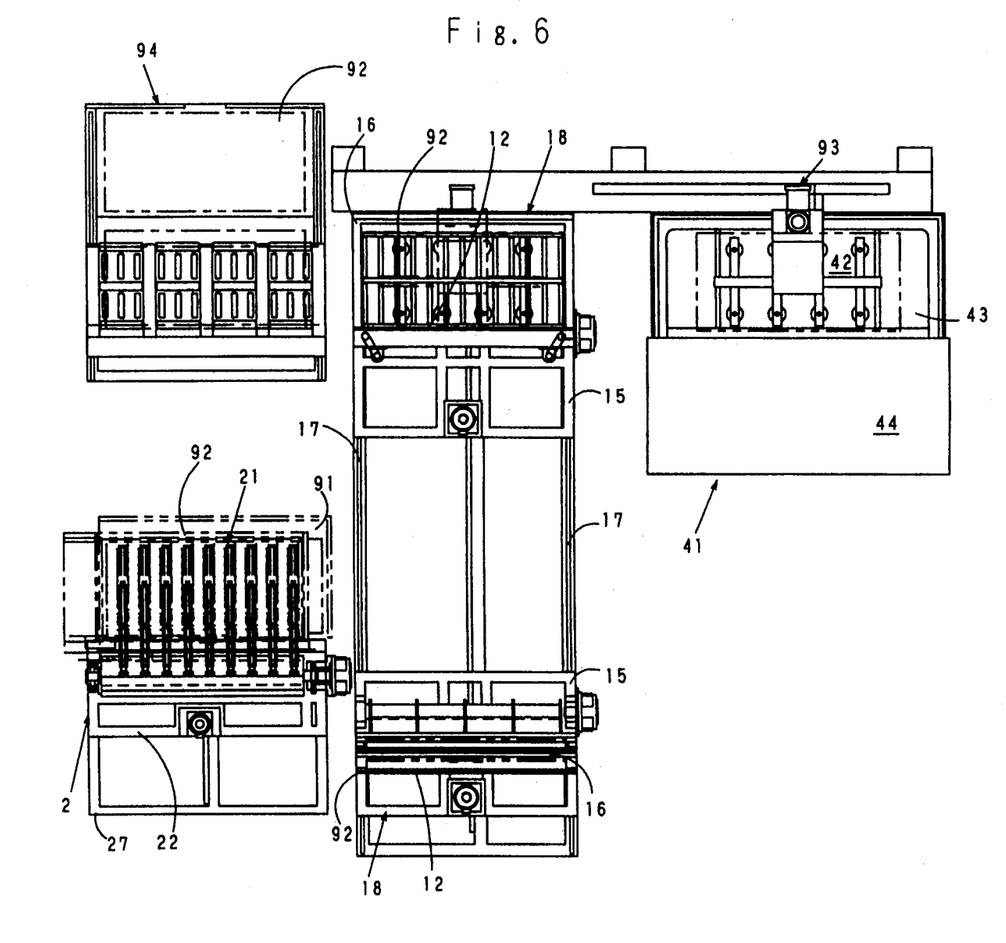
FIG. 6 is a plan view of a sheet-like workpiece delivering apparatus which is appropriate for small-kind and mass production.
Figure 7:
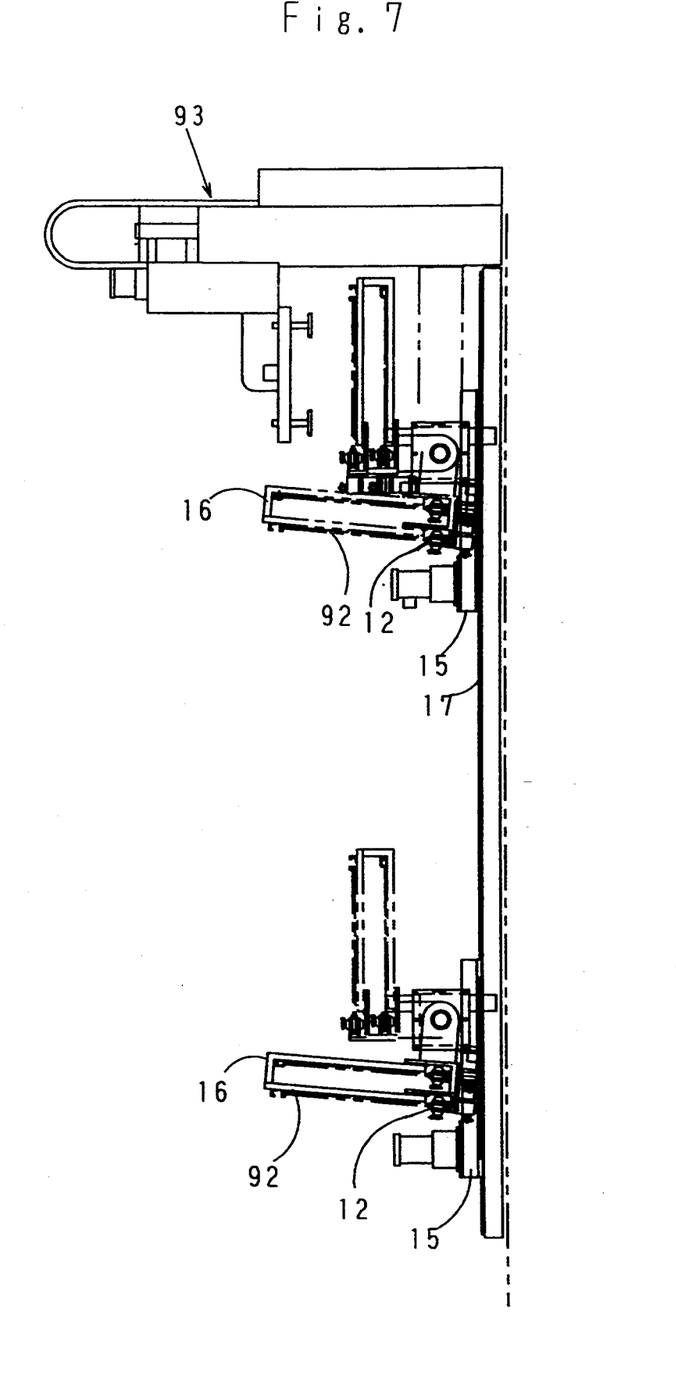
FIG. 7 is a side elevational view showing a workpiece carrier of the apparatus in FIG. 6.

A modified embodiment of the present invention will now be described with reference to FIGS. 6 to 8.

A sheet-like workpiece delivering apparatus includes a workpiece carrier 18 with a rotary support framework 16. This apparatus is used for delivering a steel workpiece 92 to be processed, to a laser beam machine (only a work table 91 of the laser beam machine is illustrated in the drawings, a main body of which is omitted from the drawings). The delivering apparatus comprises workpiece transfer means 2 disposed in front of the laser beam machine, and the workpiece carrier 18 which is movable between a first position adjacent to the workpiece transfer means 2 and a second position away from the first position. The workpiece delivering apparatus is arranged such that the workpiece 92 is transferred from a generally-available storing container 41 to the workpiece carrier 18 by means of a transporting device 93 with suction disks. The apparatus with the structure described above has an advantage that the number of the generally-available storing containers 41 to be installed is not restricted so that it can handle a large number of workpieces which are stored in the respective storing containers 41. The workpiece carrier 18 serves as buffer means for efficiently relaying the article between the storing container 41 and the workpiece transfer means 2.

Figure 8:
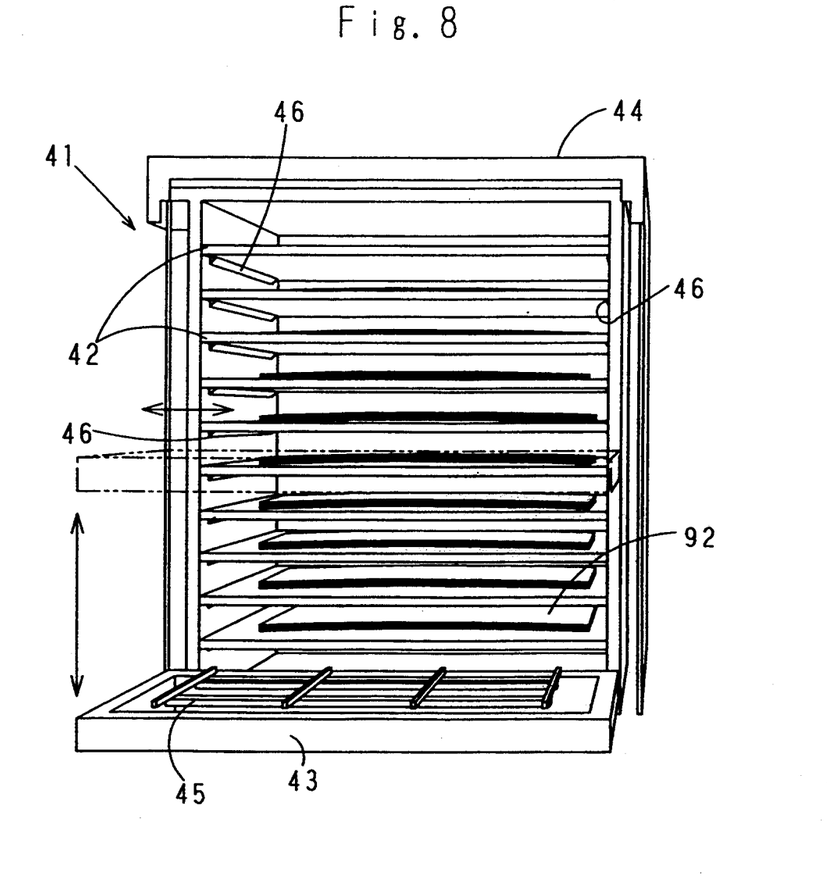
FIG. 8 is a perspective view of a generally-available storing container for use in the apparatus.

In typical, the storing container 41 comprises a box-like body 44, the front face of which is opened, as shown in FIG. 8. A plurality of pallets 42 are spacedly stacked within the box-like body 44 of the container 41. The container 41 includes an elevator 43 disposed at the front side thereof, the elevator 43 being provided with a pad 45 which is horizontally movable and vertically liftable to a level flush with a necessitated pallet 42 on which the workpieces 92 are mounted, for withdrawing the pallet 42 out of the container 41 or turning the pallet 42 back into the container 41. The pad may have a lattice-like structure or flat plate structure. The pallet 42 is supported at its opposite sides by guides 46 fixed on opposite inner surfaces of the both side walls of the box-like body 44. When taking out the pallet 42, the elevator 43 is raised to a predetermined level. The pad 45 is then inserted between the neighboring pallets 42, 42 so as to lift up the upper one. The pad 45 is withdrawn under a condition that the pallet 42 is being lifted, so as to locate the pallet 42 above the upper surface of the elevator 43. After that, the elevator 43 is lowered. Thus, the extraction of the pallet 42 is completed. The return of the pallet 42 is performed through a series of steps reverse to the above-described ones. In usual, such operations are automatically controlled. In the illustrated embodiment, the workpieces 92 having the same shapes and made of the same materials are stacked on every pallet 42 and housed in the generally-available storing container 41.

A procedure for delivering the workpiece will be explained with reference to FIG. 6.

When the pallet 42 is taken out of the storing container 41, the workpieces 92 to be processed are piled up on the pallet 42. The transporting device 93 with the suction disks may attract the uppermost workpiece 92 from above, so as to transport it to the rotary support framework 16 of the workpiece carrier 18 which stands by. The rotary support framework 16 of the workpiece carrier 18 which has stood has a function similar to the support framework 11 of the workpiece storing container 1 in the previously described embodiment. The support framework 16 is pivotable between a horizontally-extending condition and the vertically-standing condition. The rotary support framework 16 receives the workpiece 92 from the suction-disk transporting device 93 under such a condition that the framework 16 extends horizontally. According to this, the construction of the apparatus can be simplified. This is because the workpiece 92 is handled in the horizontally-extending condition by both of the generally-available storing container 41 and the suction-disk transporting device 93.

The workpiece carrier 18 is driven by a motor and moves on rails 17, 17. This is different from the previously-described workpiece storing container 1 in the first embodiment. The rotary support framework 16 is pivotally attached to a carrier base 15 so that it can pivot between the standing and horizontally-extending conditions. A chain belt 12 for feeding the workpiece 92 is located on the carrier base 15 along the lower side of the rotary support framework 16. This workpiece carrier 18 fulfills a function similar to the previously-described workpiece storing container 1 with respect to the workpiece transfer means 2, except that the rotary support framework 16 pivots for transportation of the workpiece 92 and for conveying the workpiece 92 between the storing container 41 and a finished workpiece storing container 94. In this connection, if the support frameworks 11 which do not rotate are attached to the carrier base 15 adjacently to the rotary support framework 16, the workpiece carrier 18 can be used as the workpiece storing container 1, which makes it possible to utilize a common installation space for the storing container and the carrier and to unify the manufacturing systems (realization of both multikind and small-quantity production and small-kind and mass production).

In the workpiece carrier 18, after the workpiece 92 is received by the rotary support framework 16, the rotary support framework 16 pivotally stands so that the chain belt 12 receives the workpiece 92 to support it in a standing condition. While keeping the workpiece 92 in this condition, the workpiece carrier 18 moves on the rails 17, 17 to the position adjacent to the work transfer means 2. The subsequent steps are similar to those in the case of the workpiece storing container 1, in which the workpiece 92 is sent out by the chain belt 12 from the carrier 18 to the workpiece transfer means 2 and supplied to the work table 91 by the workpiece transfer means. A rotating mechanism of the rotary support framework 16 is the same as that for the workpiece holder 21 of the workpiece transfer means 2. In this way, the workpiece carrier 18 of this embodiment has component parts or mechanisms compatible to the workpiece storing container 1 and the workpiece transfer means 2 of the primary embodiment. Therefore, the production cost of the apparatus can be suppressed, and the maintenance cost can also be reduced by using the common component parts.

After completion of the machining, the workpiece 92 is returned to the finished workpiece storing container 94 in a series of steps reverse to the above-described ones. In the illustrated embodiment, the workpieces 92 to be processed and the finished workpieces 92 are stored in the separate containers 41 and 94, respectively. With such arrangement, a large number of workpieces can easily be handled and machined with high efficiency. For example, when the workpiece carrier 18 is transporting the processed workpiece 92, the workpiece 92 to be processed is taken out of the storing container 41. Accordingly, as soon as the workpiece carrier 18 sends out the finished workpiece 92 to the finished workpiece storing container 94, the workpiece 92 to be processed can be supplied to and mounted on the workpiece carrier 18. It is thus possible to shorten a time for the operations in each of the cycles.

According to the sheet-like workpiece delivering apparatus of the present invention, firstly, it is possible to realize a manufacturing system appropriate for the multikind and small-quantity production in which various kinds of workpieces having different shapes and made of different materials are machined. Secondly, it is also possible to readily construct a manufacturing system appropriate for small-kind and mass production in which a large number of workpieces having the same shapes and made of the same materials, are handled. In each apparatus of the invention, the supply or reception, and transportation of the workpieces can be carried out by the mechanical drive, and accordingly, the sequential operations are automatically controlled, which contributes to a cost reduction due to elimination or reduction of labor and operators.

In addition, as for the sheet-like workpiece delivering apparatus with the workpiece storing container including the stationary support frameworks, it is advantageous in that it is more simplified and its occupation space is more decreased as compared with a conventional apparatus. Further, as for the sheet-like workpiece delivering apparatus with the workpiece carrier including the rotary support framework, while the finished workpiece is housed in the finished workpiece storing container, it receives the workpiece to be processed from the storing container, so that a saving of time required for handling a large number of workpieces can be accomplished. Furthermore, since the stationary support frameworks and the rotary support framework can be mounted on the common workpiece transfer means, a freedom of the process line of the apparatus in various applications can be increased, and the operation efficiency can be improved remarkably.

What is claimed is:

1. A sheet-like workpiece delivering apparatus for a machine tool comprising a workpiece transfer means disposed in front of a work table of the machine tool and workpiece storing means provided adjacently to and on the side of said workpiece transfer means, wherein:

said workpiece storing means can support a sheet-like workpiece in a standing condition, and supply the workpiece to said workpiece transfer means or receive the workpiece from said workpiece transfer means;

said workpiece transfer means can support the sheet-like workpiece in the standing condition, and receive the workpiece from said workpiece storing means or supply the workpiece to said workpiece storing means, said workpiece in the workpiece transfer means being swingably moved from the standing condition to a horizontally-extending condition or reversely about a longitudinal axis of the transfer means; and said workpiece storing means includes a plurality of support frameworks having chain conveyors disposed along the lower edges of the frameworks, which chain conveyors are driven in synchronism with the workpiece transfer means, support frameworks being spacedly arrayed and fixedly mounted on a base of the workpiece storing means in standing conditions, and said base of the workpiece storing means can move with respect to a stationary basement in a direction of array of said support frameworks.

2. A sheet-like workpiece delivering apparatus for a machine tool comprising workpiece transfer means disposed in front of a work table of a machine tool and workpiece storing means provided adjacently to and on the side of the workpiece transfer means, wherein:

said workpiece storing means can support a sheet-like workpiece in a standing condition, and supply the workpiece to said workpiece transfer means or receive the workpiece from said workpiece transfer means;

said workpiece transfer means can support the sheet-like workpiece in the standing condition, and receive the workpiece from said workpiece storing means or supply the same to said workpiece storing means, said workpiece in the workpiece transfer means being swingably moved from the standing condition to a horizontally-extending condition or reversely about a longitudinal axis of the transfer means; and a rotary support framework including a chain conveyor disposed along the lower edge of the framework, which chain conveyor is driven in synchronism with the workpiece transfer means, is attached to the base of the storing means swingably movably from a standing condition to a horizontally extending condition or reversely around a longitudinal axis thereof, and said base of said workpiece storing means can move horizontally.

3. A sheet-like workpiece delivering apparatus for a machine tool comprising workpiece transfer means disposed in front of a work table of the machine tool and workpiece storing means provided adjacently to and on the side of said workpiece transfer means, wherein:

said workpiece storing means can support a sheet-like workpiece in a standing condition, and supply the workpiece to said workpiece transfer means or receive the workpiece from said workpiece transfer means;

said workpiece transfer means can support the sheet-like workpiece in the standing condition, and receive the workpiece from said workpiece storing means or supply the workpiece to said workpiece storing means, said workpiece and workpiece transfer means being swingably moved from the standing condition or horizontally-extending condition or reversely about a longitudinal axis of the transfer means; and said workpiece transfer means includes a workpiece holder attached to a movable base swingably movably from a standing condition to a horizontally extending condition or reversely about a longitudinal axis thereof, said workpiece holder having drive bars with rotatable feeder belts and receiving bars, rollers which are driven in synchronism with the chain conveyor in the workpiece storing means, are attached to the movable base along the lower edge of said workpiece holder, and said movable base can move with respect to a stationary basement parallel to a direction of transfer of the workpiece in the workpiece transfer means.

* * * * *